(12) United States Patent
Marenco et al.

(10) Patent No.: US 12,081,272 B2
(45) Date of Patent: Sep. 3, 2024

(54) OPTICAL POWER TOOL

(71) Applicant: Cisco Technology, Inc., San Jose, CA (US)

(72) Inventors: Giovanni Marenco, Novara (IT); Claudio Crognale, Monza (IT); Davide Sirtori, Carate Brianza (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 34 days.

(21) Appl. No.: 17/848,816

(22) Filed: Jun. 24, 2022

(65) Prior Publication Data
US 2023/0421266 A1    Dec. 28, 2023

(51) Int. Cl.
*H04B 10/564* (2013.01)
*H04B 10/077* (2013.01)
*H04B 10/079* (2013.01)
*H04B 10/50* (2013.01)

(52) U.S. Cl.
CPC ..... *H04B 10/564* (2013.01); *H04B 10/07955* (2013.01); *H04B 10/0771* (2013.01); *H04B 10/5057* (2013.01)

(58) Field of Classification Search
None
See application file for complete search history.

(56) References Cited

U.S. PATENT DOCUMENTS

| | | | |
|---|---|---|---|
| 6,400,479 B1 | 6/2002 | Zhou et al. | |
| 6,724,786 B2* | 4/2004 | Jacobowitz | H04B 10/572 250/227.21 |
| 10,805,008 B1 | 10/2020 | Pelouch et al. | |
| 2003/0185563 A1* | 10/2003 | Stephens | H04B 10/296 359/25 |
| 2008/0074732 A1* | 3/2008 | Stephens | H04B 10/2941 359/334 |
| 2009/0003839 A1 | 1/2009 | Bruno et al. | |
| 2011/0318021 A1* | 12/2011 | Zhou | H04B 10/65 375/376 |
| 2015/0304033 A1 | 10/2015 | Giorgi et al. | |
| 2016/0050021 A1 | 2/2016 | Hua et al. | |

* cited by examiner

*Primary Examiner* — Darren E Wolf
(74) *Attorney, Agent, or Firm* — Edell, Shapiro & Finnan, LLC

(57) ABSTRACT

A power tool for obtaining a channel equalization and improving the signal to noise ratio in an amplified optical link. A controller obtains a plurality of optical channel power values for a plurality of channels used for transmitting optical signals on an optical link by a plurality of optical transmitters. The optical channel power values are obtained by monitoring power at an input or an output of an amplifier on the optical link. The controller then determines a power distribution among the plurality of channels based on a maximum optical power and a minimum optical power from the plurality of optical channel power values and generates a plurality of adjusted channel power values by equalizing and scaling the plurality of optical channel power values. The controller configures the plurality of optical transmitters for transmitting the optical signals on the optical link based on the plurality of adjusted channel power values.

20 Claims, 12 Drawing Sheets

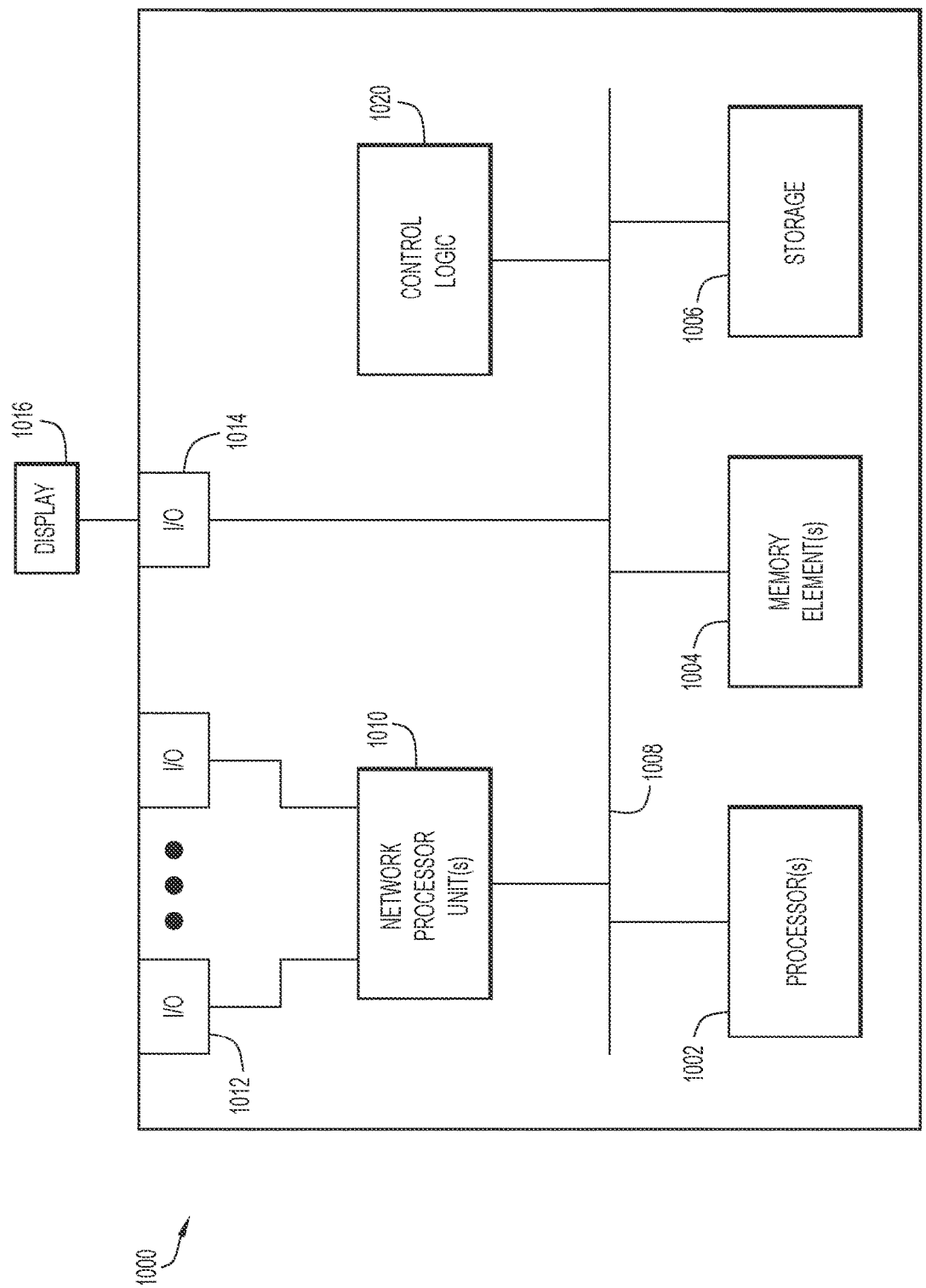

OPTICAL POWER TOOL

TECHNICAL FIELD

The present disclosure relates to optical networks.

BACKGROUND

Optical networks are commonly employed to transmit data across long distances. Wavelength-division multiplexing (WDM) network and dense wavelength-divisional multiplexing (DWDM) techniques may be employed to improve performance of an optical system. WDM and DWDM techniques involve transmitting data in optical signals at different wavelengths over a common or shared optical fiber, sometimes referred to as an optical link or an optical fiber cable. One example of this optical link is a point to point (P2P) amplified link that is equipped with a new class of transceivers such as the coherent 400G Quad Small Form Factor Pluggable Double Density (400G QSFP-DD). Due to these optical link complexities, configuration of the optical system such as setting power of the optical transceiver and the optical amplified link, is complicated and time consuming.

BRIEF DESCRIPTION OF THE DRAWINGS

FIG. 10 is a hardware block diagram of a computing device configured to perform the techniques of configuring the amplified optical link, according to various example embodiments.

DESCRIPTION OF EXAMPLE EMBODIMENTS

Overview

Figure 1:
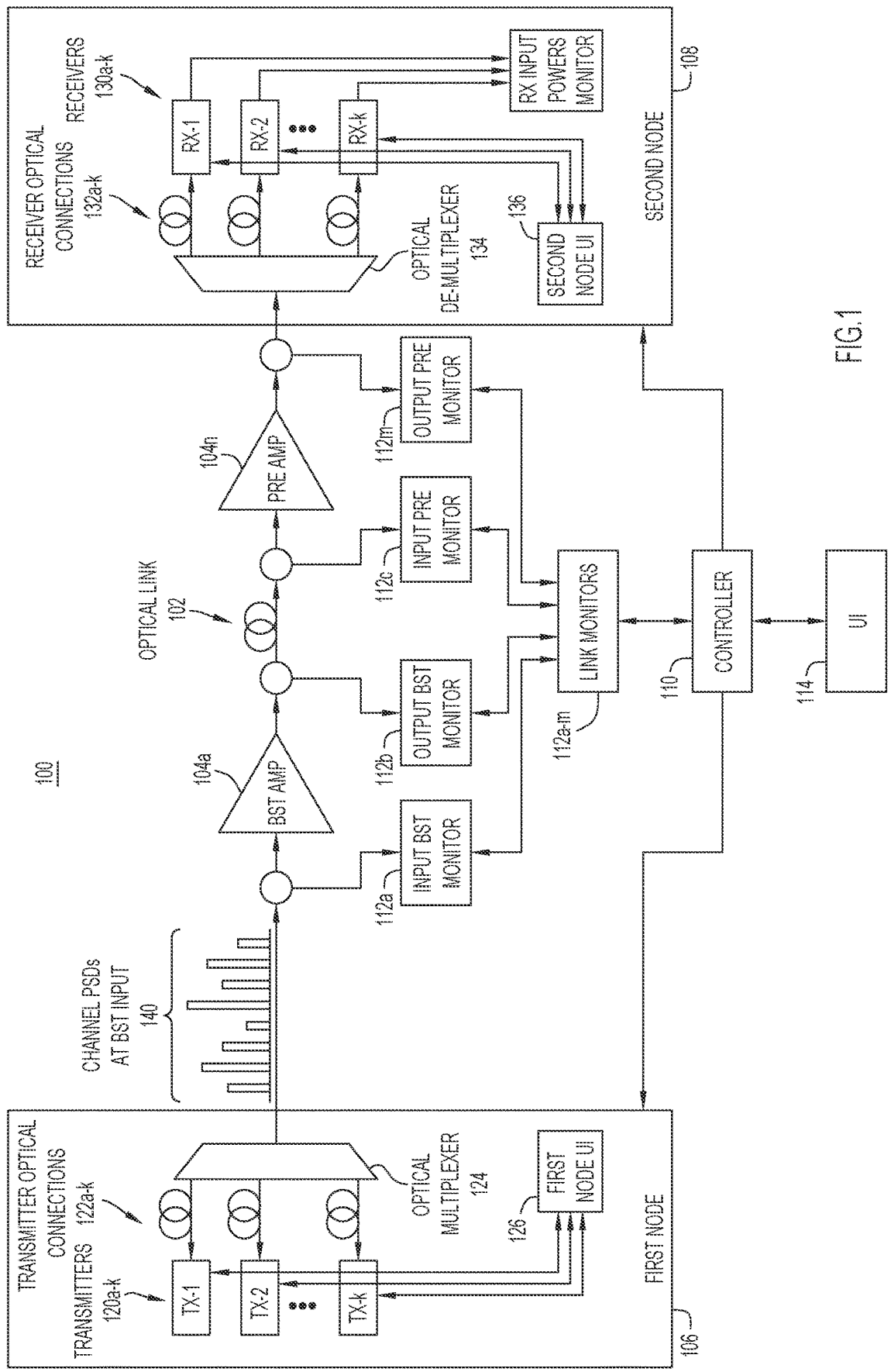
FIG. 1 is a block diagram illustrating an optical network in which a transmitter power tool may be deployed, according to an example embodiment.

Briefly, methods for configuring an amplified optical link using power pre-emphasis at a transceivers side to maximize the optical link performance, are provided.

The methods involve a controller obtaining a plurality of optical channel power values for a plurality of channels used for transmitting optical signals on an optical link by a plurality of optical transmitters. The plurality of optical channel power values are obtained by monitoring power at an input or an output of an amplifier on the optical link. The methods further involve the controller determining an optical power distribution among the plurality of channels based on a maximum optical power and a minimum optical power from among the plurality of optical channel power values and generating a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters. The methods further involve the controller configuring the plurality of optical transmitters for transmitting the optical signals on the optical link based on the plurality of adjusted channel power values.

Example Embodiments

400G QSFP-DD modules are extensively used in wide router-based amplified P2P architectures because of their high transmission capacity versus their cost ratio. However, the maximum optical power at the transmission side of 400G QSFP-DD modules, for example, at an installation phase, is unknown. The maximum optical power of these 400G QSFP-DD modules can be in a wide range of 3 dB or 4 dB. Moreover, the patch cords connecting the transmitters with the Erbium Doped Fiber Amplifier (EDFA) inputs may exhibit different losses. As a result, the power input distribution is even more widespread. Because the optical transmission powers of the 400G QSFP-DD modules can only be reduced with an internal variable optical attenuator (VOA) and cannot be increased, the performance of the optical systems is limited by this wide input power distribution, which can be further enhanced by the gain ripple of the amplifiers. While the gain tilt may be adjusted, the impact of gain ripple is not addressed.

A power pre-emphasis at the transmission side may be used to improve performance of a generic transmission link. The power pre-emphasis, however, has not been applied to address the problems noted above with respect to the new-generation power-limited P2P amplified optical links. The wide power distribution at the transmission side may be addressed by limiting the performance of the amplified optical link to the minimum allowable value of the transmission power reported in the system specification. Therefore, performance of the optical link (its transmission capacity) is not maximized and the optical link does not reach its full potential.

Moreover, due to various complexities of a typical coherent DWDM link, configuring these optical systems to maximize performance is a complex process. Given the number of optical channels typically involved and the number of operations to be made during the execution of the configuration procedure, manual configurations are cumbersome and error prone. Automated configuration processes are also tedious and complex requiring iterative procedures and/or machine learning (ML) algorithms. While automated configuration processes may possibly lead to accurate results, they are time and memory consuming, and often are narrowly tailored to the specific application/system.

To facilitate the configuration of an optical system, an optical power tool is deployed. The optical power tool is configured to maximize power of the transmitter(s) and/or the amplified optical link. The optical power tool exploits power pre-emphasis at a transmitter side and optical channel monitoring to equalize signal to noise ratio (SNR) distribution at a receiver side and to maximize average received SNR. The optical power tool is particularly suitable for maximizing performance of a DWDM system equipped with the new-generation devices such as the 400G QSFP-DD transceivers. The optical power tool is an analytical tool that does not require any iterations or any learning/test process as required in the ML approach. The optical power tool is faster than the ML without iterative procedures noted above, and uses less resources e.g., memory and computational resources. The optical power tool provides accurate configuration parameters for the optical system i.e., maximizes the power of the optical link, directly during the installation phase i.e., on the field.

FIG. 1 is a block diagram illustrating an optical network 100 in which a transmitter power tool may be deployed, according to an example embodiment.

The optical network 100 includes optical links or lines (collectively or individually referred to as an optical link 102), optical amplifiers 104a-n along a path between a first node 106 and a second node 108. For example, the optical amplifiers 104a-n include a first optical amplifier 104a and a second optical amplifier 104n. In this example, the first optical amplifier 104a is a booster amplifier (BST Amp) and the second optical amplifier 104n is a preamplifier (PRE Amp). The optical network 100 further includes a controller 110 that is in communication with the first node 106 and the second node 108 and configures one or more entities in the optical network 100. The optical network 100 further includes link monitors (also called BST or PRE monitors) 112a-m and a user interface (UI) 114.

The notations "a-n", "a-m", "a-k", and the like, illustrate that the number of elements can vary depending on a particular implementation and is not limited to the number of elements depicted in the optical network 100. Further, the optical network 100 is just one non-limiting example of an optical system and elements therein.

The optical network 100 may employ WDM or DWDM technologies to transmit data across long distances. Wavelength-division multiplexing (WDM) network and dense wavelength-divisional multiplexing (DWDM) techniques may be employed to improve performance of an optical system. WDM and DWDM techniques involve transmitting data in optical signals at different wavelengths over a common or shared optical fiber, sometimes referred to as the optical link 102 or an optical fiber cable. One example of the optical link 102 is a point to point (P2P) amplified link that is equipped with a new class of transceivers such as the 400G Quad Small Form Factor Pluggable Double Density (hereinafter referred to as QSFP-DD).

Due to complexities of an amplified optical link, configuration of the optical network 100 such as setting power of the optical transceivers and the optical link 102 become complicated and time consuming. In one or more example embodiments, the transmitter power tool uses the one or more of the link monitors 112a-m to monitor power values among a plurality of channels on the optical link 102 and uses the controller 110 to perform a pre-emphasis in which a plurality of adjusted channel power values that are equalized and scaled are generated for the optical transceivers based on a determined optical power distribution among these channels. The optical transmitting side (transceivers) are then configured to transmit optical signals on the optical link 102 based on these adjusted channel power values.

In FIG. 1, the optical link 102 is connected between two terminal points or nodes (the first node 106 and the second node 108). An example of the optical link 102 is one or more subterranean optical fibers or cables that transmit optical signals between the first node 106 and the second node 108 i.e., for bidirectional communication. In this example, the optical link 102 carries an optical signal from the first node 106 to the second node 108. The optical signal spans various DWDM channels. The optical amplifiers 104a-n assist in propagating the optical signals along the length of the optical link 102. The optical amplifiers 104a-n are configured with a predetermined tilt and gain, as explained below.

The first node 106 is an example of an aggregation node and the second node 108 is an example of a disaggregation node. The first node 106 includes transmitters 120a-k, transmitter optical connections 122a-k, and an optical add/drop multiplexer (OADM) or reconfigurable optical add/drop multiplexer (ROADM), referred to as optical multiplexer 124, and a first node user interface (first node UI) 126. Each of the transmitters 120a-k is connected, using the transmitter optical connections 122a-k such as optical patch panels, optical fibers, optical connectors, optical socket, etc., to the optical multiplexer 124. The transmitters 120a-k may be transceivers in one example embodiment.

In one example embodiment, the optical multiplexer 124 is connected to the first optical amplifier 104a such as an EDFA optical amplifier (the BST Amp), working in a Booster (BST) configuration. The first optical amplifier 104a is in turn connected to the second optical amplifier 104n via the optical link 102 such as an optical single-mode (SM) fiber cable. The second optical amplifier 104n may also be an EDFA optical amplifier (the PRE Amp), working in a preamplifier (PRE) configuration. The second optical amplifier 104n is connected to the second node 108.

The second node 108 includes receivers 130a-k, receiver optical connections 132a-k, and an optical add/drop multiplexer (OADM) or reconfigurable optical add/drop multiplexer (ROADM), referred to as optical demultiplexer 134, a second node user interface (second node UI) 136, and a receiver input powers monitor 112d. The optical demultiplexer 134 is connected to the second optical amplifier 104n, demultiplexes the optical signals received via the optical link 102 and provides the signals to the receivers 130a-k using receiver optical connections 132a-k such as optical patch panels, optical fiber, optical connectors, optical sockets, etc. In one example, the receivers 130a-k are transceivers.

The link monitors 112a-m measure, in real time, the optical powers at the input/output of each of the optical amplifiers 104a-n and/or at the input of each of the receivers 130a-k.

The OADM or ROADM serves as an aggregation node when it transmits the optical signal via the optical link 102 and serves as a disaggregation node when it receives the optical signal from the optical link 102. An aggregation node i.e., first node 106, aggregates or combines optical signals received from some of the data sources via the transmitter optical connections 122a-k. A disaggregation node i.e., second node 108, separates the optical signals received from the optical link 102 and provides the separated optical signals to some of the data sources via the receiver optical connections 132a-k.

In one example, the transmitters 120a-k and the receivers 130a-k are transponders that transmit data or receives data from the other node depending on a configuration by the controller 110. The transponders include components configured to provide bidirectional communication. For example, each of these optical network elements may include an optical transmitter and an optical receiver. The optical transmitter includes a transmit module and a transmitter digital signal processor (DSP) and an optical receiver include a receiver module and a receiver DSP. The transmit module and the receive module may be optical pluggable modules configured to transmit and receive optical signals, respectively. The DSPs process the optical signals and perform various signal processing operations, such as changing transmission parameters. These optical network elements may further include a processor and a memory. The processor controls the components of its optical network element, may change transmission parameters, and evaluate quality of signal (QoS) based on the information from the DSPs. The processor within each of the transponders changes the transmission parameters based on instructions from the controller 110.

The controller 110 may be a remote controller that remotely sets the system configuration, vary the optical power of each of the transmitters 120a-k at the transmission side and reads the optical powers at the monitor outputs from the link monitors 112a-m.

The controller 110 controls the overall configuration of the optical network 100 and communicates with the optical network elements. The controller 110 symmetrically configures the optical network elements to optimize configuration parameters of the optical link 102 using the optical power tool i.e., to maximize transmission power and to reduce SNR variations at a receiver side. The controller 110 may instruct to display measured power values or other data on the UI 114, the first node UI 126, and/or the second node UI 136. An operator may configure the first node 106 using the first node UI 126, the second node 108 using the second node UI 136, and/or the UI 114.

The controller 110 obtains optical channel power values for a plurality of channels from the input BST monitor 112a, the output BST monitor 112b, the input PRE monitor 112c, and/or the output PRE monitor 112m. For example, wide channel power distribution (PSDs) may be observed at an input of the first optical amplifier 104a, as depicted at 140.

The controller 110 may then determine optical power distribution based on a maximum optical power and a minimum optical power from these power values and generate adjusted channel power values by equalizing these optical channel power values to reduce SNR variation and by scaling these optical channel power values based on the maximum allowable optical powers of plurality of optical transmitters. In one example, the controller 110 may set and monitor the channel powers from each one of the transmitters 120a-k in the first node 106 via the first node UI 126, and further determine the received channel powers using the receiver input powers monitor 112d, to check if they are within the range of allowable values for the 400G QSFP-DD receivers.

The controller 110 deploys the optical power tool, which exploits power pre-emphasis at the transmitter side and the link monitors 112a-m to equalize the OSNR distribution at the receiver side and improve the average received OSNR in the optical link 102. The optical transmitter tool involves (1) generating a baseline configuration, (2) configurating one or more of the optical amplifiers 104a-n and selecting a monitoring point from one of the link monitors 112a-m, referred to as a pre-optimization method, (3) performing pre-emphasis, referred to as a link optimization method, in which the transmitters 120a-k and the optical link 102 are configured to equalize the OSNR distribution at the receiver side. The optical transmitter tool then configures the optical network 100 using the values derived in the pre-emphasis.

Figure 2:
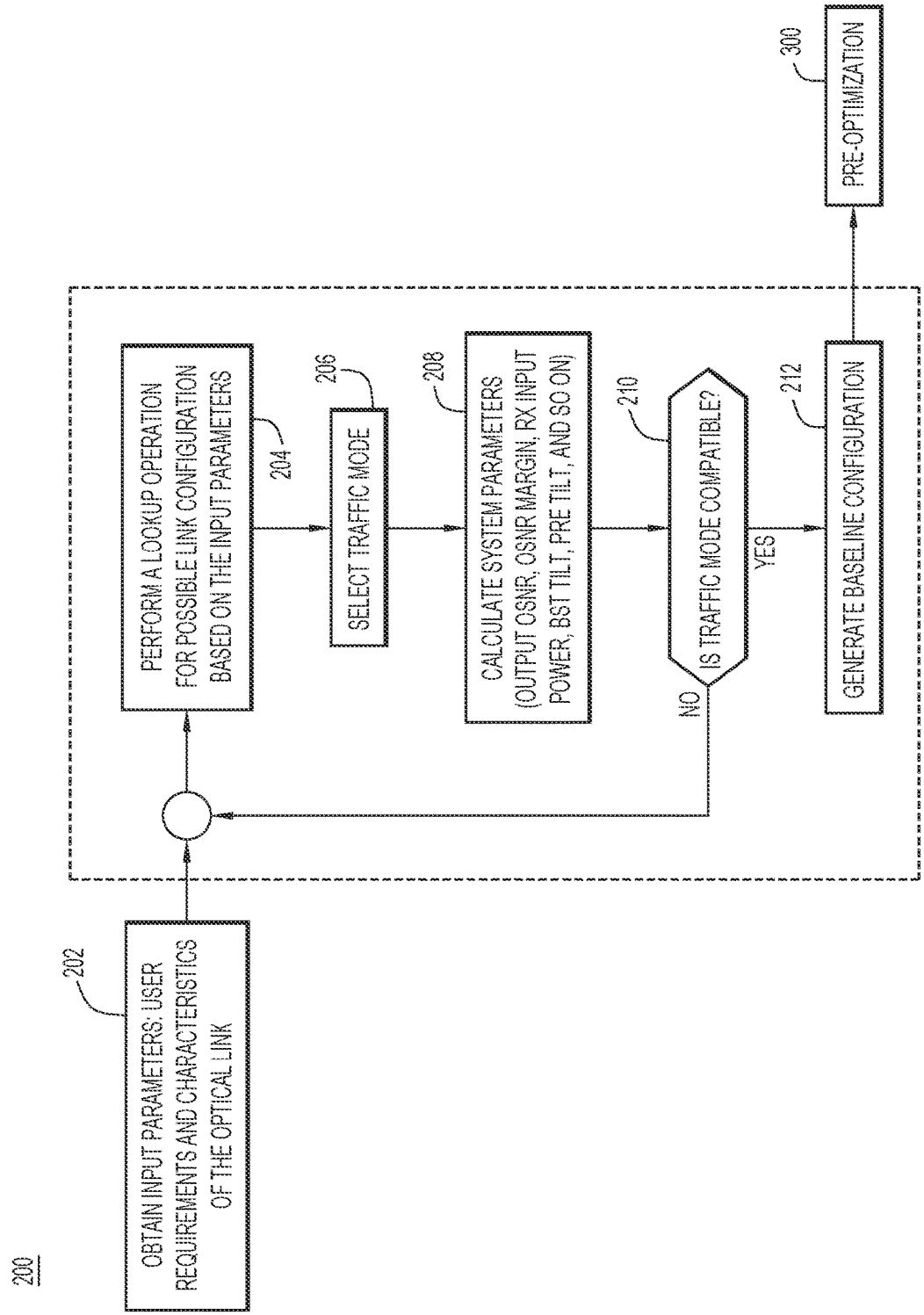
FIG. 2 is a flowchart illustrating a method of generating a baseline configuration, according to an example embodiment.

With continued reference to FIG. 1, reference is now made to FIG. 2. FIG. 2 is a flowchart illustrating a method 200 for generating a baseline configuration, according to an example embodiment. The method 200 may be performed by a network entity such as the controller 110.

The method 200 involves at 202, obtaining input parameters that characterize the optical link 102 and user requirements e.g., the OSNR margin specified by the user via the UI 114, the first node UI 126, and/or the second node UI 136. For example, the input parameters may include characteristics of the optical link 102 such as but not limited to maximum and minimum connection losses, link loss, optical fiber type, etc.

Based on the input parameters, at 204, the controller 110 performs a lookup operation for a possible link configuration. The lookup operation involves searching a lookup table for one or more of: the line rate, bits per second (bps), maximum allowable output power of the first optical amplifier 104a (BST output power), maximum allowable output power of the second optical amplifier 104n (PRE output power), minimum and maximum allowable power for the second node 108 (receiver power), noise figure (NF) for the optical amplifiers 104a-n versus input power therein, SNR values that include a required SNR of the optical link 102 based on back to back (B2B) measurements ($RSNR_{B2B}$). These are but some non-limiting examples.

At 206, the controller 110 selects a traffic mode. The controller 110 may select the highest traffic mode compatible with an overall available bandwidth, expected capacity of the optical link 102, number of trunks, and other requirements for the optical link 102. For example, the controller 110 may set the traffic mode to 400 Gbps with a given modulation scheme, such as 16 States Quadrature Amplitude Modulation (16QAM), as default parameters of the optical link 102.

At 208, the controller 110 calculates system parameters for the optical network 100. The system parameters may include the OSNR of the optical link 102, the maximum and the minimum power on the receiver side (e.g., the second node 108), the OSNR margin, tilt of the optical amplifiers 104a-n, etc.

At 210, if the traffic mode is not compatible with the system parameters generated at 208, the method 200 returns to operation 204. At 204, another lookup operation is performed for a different possible link configuration and at 206, a more reliable traffic mode is selected e.g., 200 Gbps.

On the other hand, at 210, if the selected traffic mode is compatible with system parameters, then, at 212, the baseline configuration is generated for the selected traffic mode. The baseline configuration includes, by way of an example, parameters for the optical amplifiers 104a-n such as tilt and/or gain, transmission power values for the transmitters 122a-k, etc. The baseline configuration is consistent with system specifications and link characteristics.

In other words, in the method 200, the controller 110 selects the highest traffic mode which is compatible with the link characteristics and user requirements. The estimation of the highest traffic mode may be obtained by using a worstcase or a probabilistic approach, depending on the choice of the user. The highest selected traffic mode and the calculated system parameters derived at 208 and 210, become part of the baseline configuration, which may then be used as an input for a pre-optimization method 300, described below.

Figure 3:
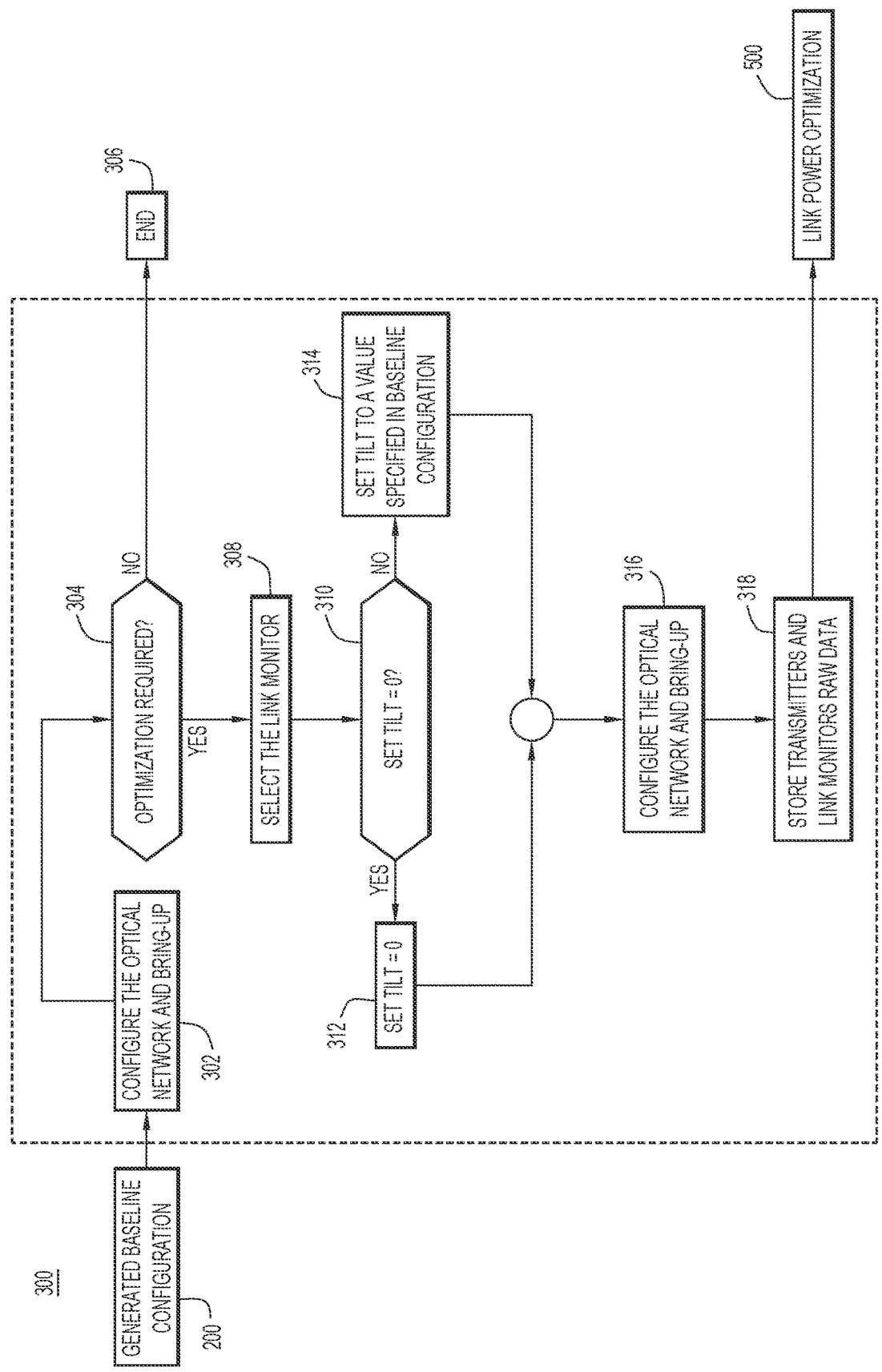
FIG. 3 is a flowchart illustrating a pre-optimization method of setting a tilt for one or more optical amplifiers on an optical link, according to an example embodiment.

With continued reference to FIGS. 1 and 2, FIG. 3 is a flowchart illustrating the pre-optimization method 300 of setting a tilt for one or more of the optical amplifiers 104a-n, according to an example embodiment. The pre-optimization method 300 may be performed by a network entity such as the controller 110.

The pre-optimization method 300 involves at 302, configuring the optical network 100 using the baseline configuration generated in the method 200 of FIG. 2 and bringing it up. In other words, the optical network 100 is brought to an operational state in which it is ready for use or is on the field. In the operation state, the optical network 100 transmits and/or receives one or more optical signals. If no further configuration changes and/or maximizing the performance of the optical link 102 are required (no optimization is required at 304), the pre-optimization method 300 ends at 306. That is, the optical network 100 is configured for use of transmitting and receiving the optical signals (operatively applied on the field) according to the baseline configuration generated in the method 200 of FIG. 2. That is, based on the baseline configuration, the transmitters 120a-k are set with a predetermined optical power and the optical amplifiers 104a-n are set with a predetermined gain and tilt, to produce the plurality of optical channel power values.

On the other hand, if further optimizations are desired e.g., maximize performance of the optical link 102, at 308, a link monitor from the link monitors 112a-m is selected. The selected link monitor is one of the input BST monitor 112a, the output BST monitor 112b, the input PRE monitor 112c, and/or the output PRE monitor 112m. In one example, the user specifies the starting configuration to maximize the performances of the optical network 100. The selection may depend on numerous factors such as the position of the monitor, the targeted accuracy, the characteristics of the amplifies, and so on. Various monitoring points along the optical link 102 may be selected such as an input or an output of one of the optical amplifiers 104a-n. In another example, the controller 110 may select one or more starting configurations based on various input parameters. The starting configuration includes one of the link monitors 112a-m.

As an example, if the output BST monitor 112b is selected, then only the dis-equalization introduced at the BST output is to be recovered, considering negligible or in any case acceptable the dis-equalization introduced by the optical link 102 and all other devices after the first optical amplifier 104a on the optical link 102. In this case, the user may set the BST gain tilt=0, with the intention of nulling the dis-equalization at the BST output only, and compensating the tilt induced by the Stimulated Raman Scattering (SRS) (such as a quasi-linear increment versus wavelength of the channel powers along the whole C-Band spectrum) after performing the link optimization method.

The BST gain tilt value obtained in the method 200 (during the baseline configuration) needs to compensate the tilt due to the SRS introducing, on the channel distribution at the BST output, a linear decrement of the channel powers versus wavelength, with an opposite sign of slope with respect to the SRS tilt. The nonlinear effect due to the SRS mainly increases with the total optical power injected into the optical link 102, at the output of the first optical amplifier 104a, and only slightly depends on the power channel distribution. This means that it may be enough to keep the total optical power at the fiber input constant to obtain (with an acceptable accuracy) the same SRS tilt spectral distribution at the output of the link (i.e., at the PRE Amp input). As explained below, if the output BST monitor 112b is selected, when performing link optimization, the BST output is equalized with a BST gain tilt being equal to 0. After restoring the BST gain tilt value and the total output power exiting from the first optical amplifier 104a (during the baseline configuration), the SRS tilt is also compensated because the total optical power exiting from the first optical amplifier 104a is equal to the value in the baseline configuration, and then the BST gain tilt acts on the same amount of nonlinear effect.

At 310, the pre-optimization method 300 involves checking whether the tilt is to be set to 0. For example, if the BST output was selected as an optical channel monitor (OCM) i.e., the output BST monitor 112b, then the controller 110 checks whether the tilt of the first optical amplifier 104a is to be set to 0. If the operator selects to set the tilt to 0 (yes at 310), at 312, the tilt of the first optical amplifier 104a is set to 0. On the other hand, if the operator selects not to set the tilt to 0, at 314, the tilt of the first optical amplifier 104a is set to a value specified in the baseline configuration e.g., −2.

At 316, the controller 110 configures the optical network 100 with the tilt set at 312 or 314 and restores the optical network 100 to its operational state, on the field (brings it up). Based on operating the optical network 100 by propagating the optical signals from the first node 106 to the second node 108 via the optical link 102, an optical spectrum analyzer (OSA) obtains power values from one or more of the link monitors 112a-m. The OSA may display various obtained power values on the UI 114, the first node UI 126, and/or the second node UI 136. The OSA is just one example and any other device capable of monitoring the channels optical powers versus frequency along the C-Band spectrum may be used. In one example, the link monitors 112a, 112b, 112c, and 112m are embedded inside line cards of the amplifiers 104-a-n. However, any types of monitors may be used depending on a particular use case scenario and availability.

With continued reference to FIGS. 1-3, FIGS. 4A and 4B are views illustrating optical power distributions 400 and 450, respectively, of a plurality of channels of the optical link 102, which is detected by monitoring power at different monitoring points on the optical link 102, according to example embodiments. X-axis represent the channel comb or wavelength in nano meters (nm) mapped against measured optical power values in decibel milliwatt (dBm) on the y-axis. The baseline configuration and/or set parameters for the optical network 100 are shown at a numeric reference 402.

Figure 4A:
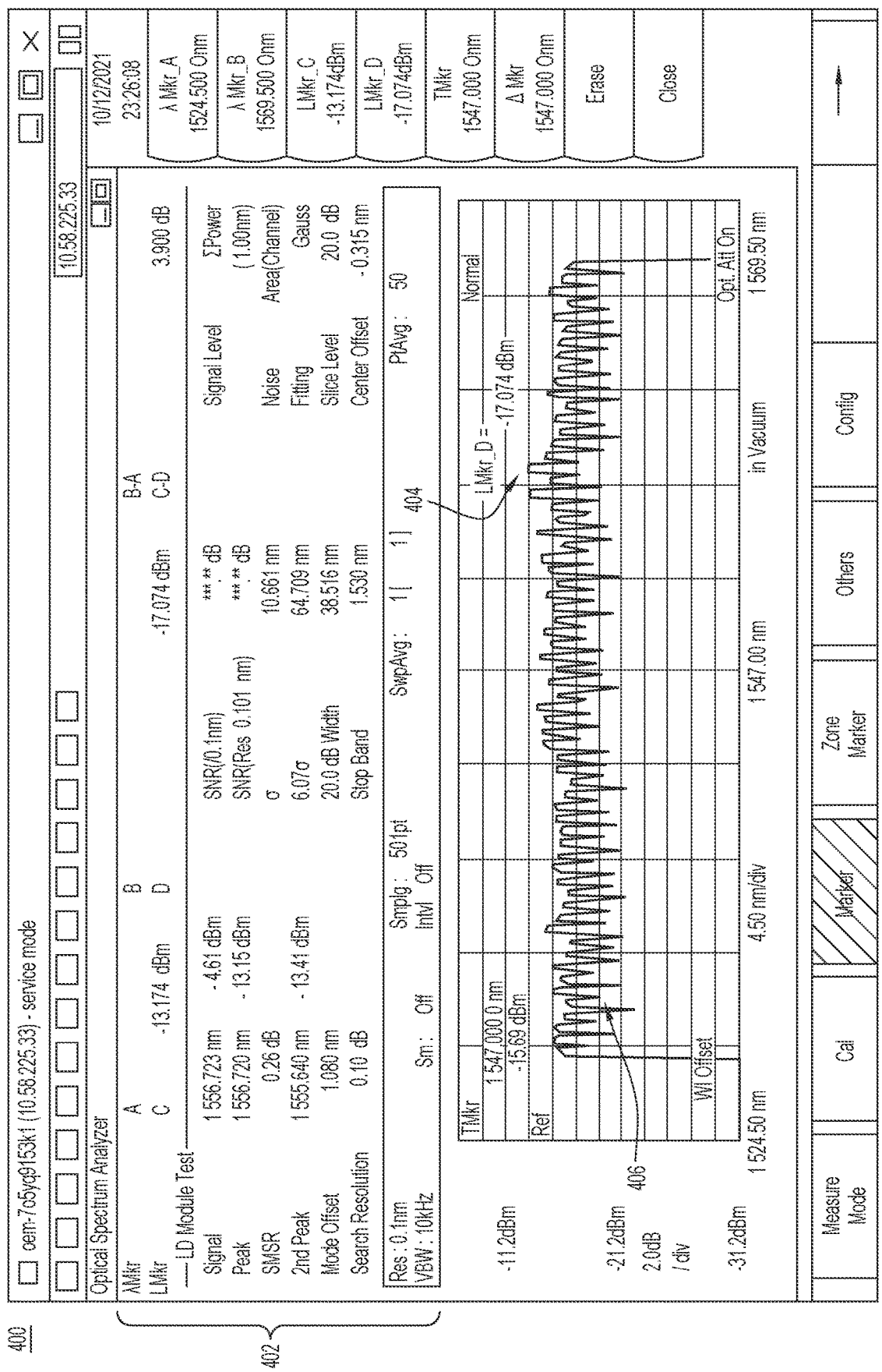
FIGS. 4A and 4B are views illustrating several optical power distributions among a plurality of channels of an optical link, detected by monitoring the optical power at several monitoring points on the optical link, according to example embodiments.

Specifically, FIG. 4A shows a first optical power distribution 400 measured at an input of the first optical amplifier 104a. The first optical power distribution 400 is measured using the input BST monitor 112a. The maximum optical power value 404 is approximately at −17 dBm and the minimum optical power value 406 is approximately at −21 dBm. The first optical power distribution 400 among the plurality of optical channels is approximately 4 dB i.e., the difference between the maximum optical power value 404 and the minimum optical power value 406. This may lead to dis-equalization of the SNR at a receiver side (at the second node 108) and needs to be recovered.

Figure 4B:
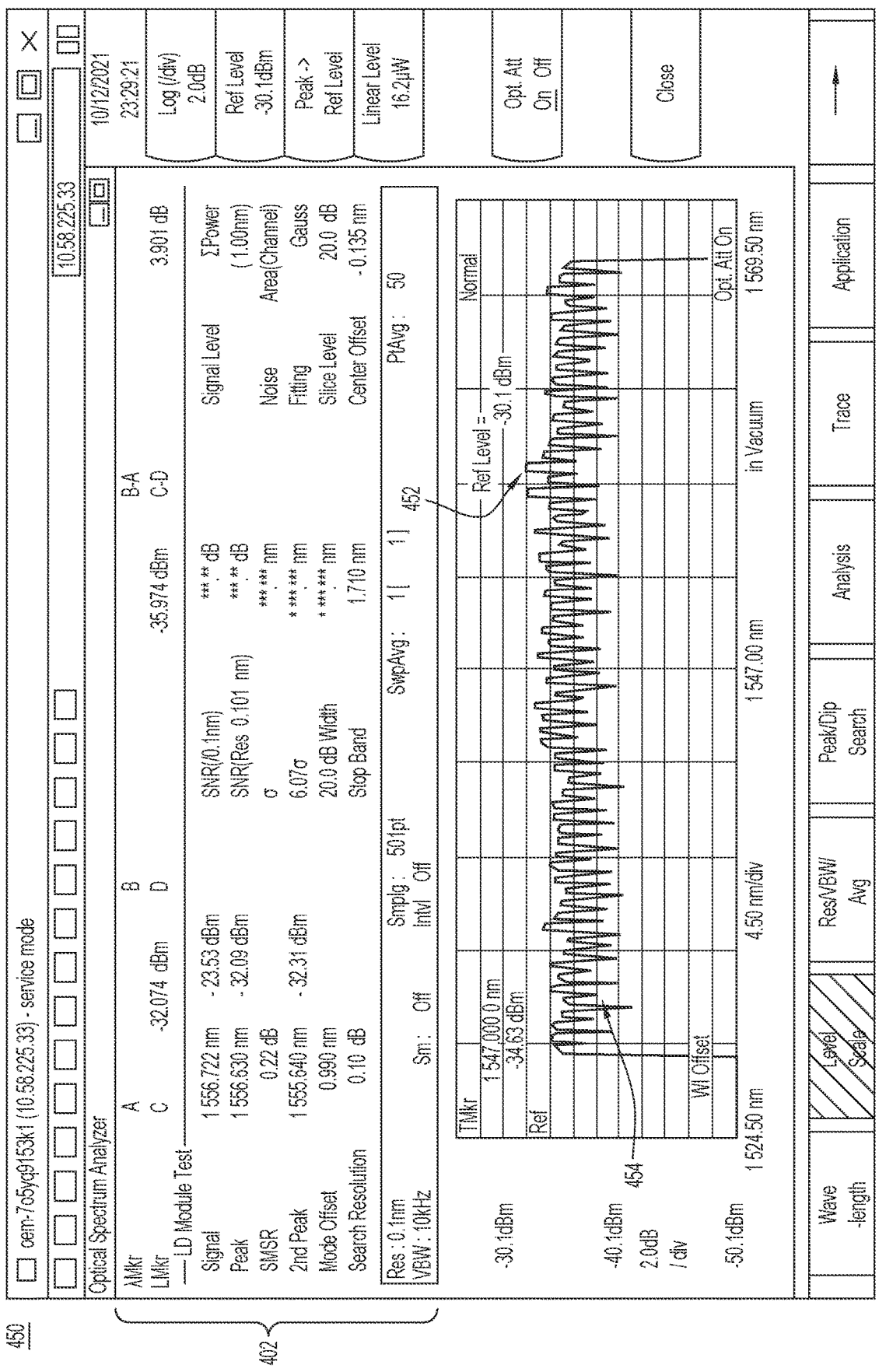

FIG. 4B shows a second optical power distribution 450 measured at an input of the second optical amplifier 104n. The second optical power distribution 450 is measured using the input Pre monitor 112c. The maximum optical power value 452 is approximately at −30 dBm and the minimum optical power value 454 is approximately at −34 dBm. The second optical power distribution 450 among the plurality of optical channels is also approximately 4 dBm and leads to dis-equalization of the SNR at a receiver side (at the second node 108), which needs to be recovered.

Referring back to FIG. 3, at 318, the measured raw data values are stored in a memory of the controller 110, for example, and are used for the link optimization method 500, described below. The measured raw data values are obtained using the baseline configuration that includes the selected traffic mode for the transmitters 120a-k and a gain for the optical amplifiers 104a-n.

With continued reference to FIGS. 1-4B, FIG. 5 is a flowchart illustrating the link power optimization method 500 in which the plurality of transmitters 120a-k are configured for transmitting optical signals on the optical link 102 based on adjusted power values, according to an example embodiment. The link optimization method 500 may be performed by a network entity such as the controller 110 and uses the raw data values generated in the pre-optimization method 300.

The link optimization method 500 involves four main stages: (1) an error estimation stage 504, (2) a power adjustment stage 506, (3) a power scaling stage 508, and (4) a deployed configuration stage 510. These stages are illustrated to facilitate and simplify the description of the link optimization method 500.

At 502, the controller 110 obtains raw data values generated in the pre-optimization method 300. The raw data values include transmission powers of the transmitters 120a-k and are referred to as "TXpower(i)" where (i) is one of the transmitters 120a-k that is used for transmitting optical signals onto the optical link 102. The raw data values may further include optical channel power values referred to as "Power$_{monitor}$(i)" where (i) is one of the optical channels on the optical link 102. The optical channel power values are measured by one or more of the link monitors 112a-m.

The error estimation stage 504 uses the raw data values to obtain a list of power deviation values for the optical channels on the optical link 102. In other words, the controller 110 uses the optical channel power values (Power$_{monitor}$(i)) to obtain an error value referred to as Δpower(i)), for each channel (i).

Specifically, the controller 110 finds and selects the maximum and the minimum values in the entire range of optical channel powers values (output by the transmitters 120a-k and detected by one of the link monitors 112a-m). The maximum optical power is referred to as MAX[Power$_{monitor}$(i)] and the minimum optical power is referred to as MIN[Power$_{Monitor}$(i)]. For each optical channel, the controller 110 then calculates the error value (Δpower(i)) using the following equation:

$$\Delta_{Power}(i) = PowerMonitor(i) - \frac{\text{MAX}[PowerMonitor(i)] + \text{MIN}[PowerMonitor(i)]}{2}, \quad (1)$$

where PowerMonitor(i) is the raw data value for the channel (i) such as the optical channel power value detected at a monitoring point on the optical link 102.

In the error estimation stage 504, a list of error values, ΔPower(i)s, for the plurality of channels are calculated using the above equation (1). The error values, ΔPower(i)s, represent power deviation values with respect to an average power among the plurality of channels. The power deviation values form an optical power distribution, which is then used to adjust the transmission power values of the transmitters 120a-k, as explained below.

The power adjustment stage 506 involves equalizing the transmission powers of the transmitters 120a-k using the respective power deviation values. The optical power distribution is used to reduce the SNR variation at the receivers 130a-k.

In the power adjustment stage 506, the transmission powers of the transmitters 120a-k are adjusted using the equation below.

$$TX_{Power-Adjusted}(i) = \text{TXpower}(i) - \Delta_{Power}(i), \quad (2)$$

where TXpower(i) is power output by a respective transmitter from the transmitters 120a-k, which is monitored by the first node UI 126 at the respective transmitter output, and ΔPower(i) is a respective power deviation value measured at the monitoring point along the optical link 102 for the respective optical channel. In another example embodiment, the TXpower(i) is a reference power value based on an attenuation value of the Variable Optical Attenuators (VOA) embedded inside the respective transmitter. The reference power value is set and monitored by the first node UI 126.

In the power adjustment stage 506, a list of new values of transmission powers are produced ($TX_{Power-Adjusted}(1i)$ for each channel (i)). These adjusted transmission power values are generated by equalizing the plurality of transmission power values using the optical power distribution derived in the error estimation stage 504. These new equalized or adjusted transmission power values compensate for and/or reduce the SNR variation at the receiver side (the receivers 130a-k). In other words, the power equalization obtained in the power adjustment stage 506 reduces wide power spread at a transmission side and improves equalization of the OSNR at the receiver side.

Next, the power scaling stage 508 is performed, which involves scaling the transmission power values by taking in account the distribution of maximum allowable channel power values in the frequency spectrum. In an example embodiment, a power scaling operation in the power scaling stage 508 satisfies three main conditions:

1. The amount of power scaling is the same for the channels 122a-k.
2. The scaled powers of the transmitters 120a-k have the same power distribution of the new power values $TX_{Power-Adjusted}(i)$ along the spectrum, except for a constant value of power, given by the power scaling.
3. Each scaled channel power of the transmitters 120a-k is less or at maximum equal to its own maximum allowable power value.

In one example embodiment, the controller 110 obtains a list of power deviation values, ΔPower(i). By negating (NEG) ΔPower(i) values, a corresponding list of differences occurring between the new adjusted transmission power values and the previous TXpower(i) is obtained. Selecting the maximum value (MAX) in the range of this list, the amount of scaling is derived as MAX{NEG[ΔPower(i)] }. This represents the constant value to subtract from the $TX_{power-Adjusted}(i)$. The controller 110 then scales every corresponding adjusted transmission power value obtained in the power adjustment stage 506 using the selected maximum value in the range of negated optical channel power deviation values.

In one example, every channel has its own maximum allowable transmission power value that may be different from one other. This value may be an intrinsic characteristic of a respective transmitter depending on its technology.

In one example, the transmission powers for the transmitters 120a-k are downscaled to be equal to or to be below each maximum allowable transmission power value. The downscaled optical transmission power values are obtained using the following equation.

$$TX_{Power\text{-}Scaled}(i) = TX_{Power\text{-}Adjusted}(i) - \text{MAX}\{NEG[\Delta_{Power}(i)]\}, \quad (3)$$

where the controller 110 finds the maximum value in the negated optical channel power deviations using the MAX{NEG[ΔPower(i)]}. Then, the controller 110 subtracts the MAX{NEG[ΔPower(i)]} value from every corresponding adjusted transmission power value, $TX_{Power\text{-}Adjusted}(i)$.

The controller 110 then produces a list of scaled transmission power values i.e., the $TX_{Power\text{-}Scaled}(i)$ for the transmitters 120a-k.

The power scaling stage 508 satisfies a heavy constraint at the transmission side, especially introduced when the new class of transceivers e.g., the 400G-QSFP-DD modules, is in use. In fact, the maximum allowable optical transmission powers of these QSFP-DD modules are often quite low and can exhibit a large unpredictable power deviation (even 4 dB). The transmitter powers can only be reduced using an internal variable optical attenuator (VOA), and not increased. Moreover, apart from the type of transceiver to consider, the optical modules may exhibit a limit value of maximum optical transmit power. Because the overall losses introduced by the optical cables, patch-panels, and other equipment can be significant, the maximum allowed power of some transmitters in the channel distribution might not suffice to reach the required $TX_{Power\text{-}Adjusted}(i)$ needed to realize the power equalization. The scaled channel power values, $TX_{Power\text{-}Scaled}(i)$, on the other hand, are a new equalized optical power distribution that allows realizing the proper transmission power distribution by considering this limitation.

The equation (3) explained above is just one non-limiting example of scaling the channel power distribution. Other techniques for scaling the channel power distribution may be applied. For example, according to another example embodiment, a look-up-iterative procedure is performed to calculate the downscaling that maintains the scaling conditions noted above.

With continued reference to FIGS. 1-5, FIG. 6 is a diagram 600 illustrating the power channel distributions before, during, and after the link optimization method 500, according to an example embodiment. The x-axis represents frequency spectrum in gigahertz (GHz) for the optical channel comb and the y-axis represents optical transmission power values in dBm (as measured by one of the link monitors 112a-m). For example, the optical transmission powers are measured by the input BST monitor 112a (part of the OSA).

A first power channel distribution 610 includes a plurality of optical channel power values prior to performing the link optimization method 500. The transmitters 120a-k are set at the maximum allowable transmission power, and transmission power for each optical channel, at the transmission side, can only be reduced but not increased.

A second power channel distribution 620 includes a plurality of adjusted channel power values i.e., the $TX_{Power\text{-}Adjusted}(i)$ values obtained in the power adjustment stage 506. The second power channel distribution 620 includes a set of transmission power values that are above the first power channel distribution 610 for the same channels (i)s.

As explained above, the transmitters 120a-k are set at the maximum allowable power. Consequently, the optical powers produced by the transmitters 120a-k can only be decreased and the power values that are required to be set above the corresponding maximum allowable power e.g., power value depicted with a circle at 625 (related to a maximum allowable power value depicted with the other circle at 615 just below), are not feasible. Therefore, the transmission power distribution is downscaled to satisfy this constraint.

A third power channel distribution 630 includes a plurality of downscaled transmission power values i.e., $TX_{Power\text{-}Scaled}(i)$ obtained in the power scaling stage 508. In deriving the $TX_{Power\text{-}Scaled}(i)$ list, the controller 110 downscales the adjusted transmission power values i.e., the $TX_{Power\text{-}Adjusted}(i)$ by an amount that leads to the third power channel distribution 630. The third power channel distribution 630 has every channel power value less than the maximum allowable power for the corresponding transmitter, except for the channel at 615. The channel at 615, after applying the scaling procedure, exhibits a power value equal to its maximum allowable power. In other words, the channel at 615 is an example of the application of the maximum value in the negated optical channel power deviations (the MAX{NEG[ΔPower(i)]} value in the 508 stage of FIG. 5) and represents the only channel power in the third power channel distribution 630 that is not adjusted with respect to the first power channel distribution 610 because it is already at its maximum allowable power. As a result, the channel power at 615 remains the same as in the first power channel distribution 610. Further, channel power values of other channels in the frequency band are adjusted and downscaled below their corresponding maximum allowable power value, producing the third power channel distribution 630 This is one example of downscaling the first power channel distribution 610 and others downscaling techniques may be applied based on the scaling conditions listed above.

In another example embodiment, if the powers of the transmitters 120a-k are initially set (preset) below the maximum allowable value, the power scaling stage 508 is performed with respect to the initial or the maximum allowable value.

The error estimation stage 504, the power adjustment stage 506, and the power scaling stage 508 provide a power pre-emphasis at a transmission side and reduces the power spread/distribution among the plurality of channel to approximately 1 dB or less and/or improves the OSNR of the optical link 102 by at least 1.5 dB (maximizes the average received OSNR).

Referring back to FIG. 5, in one or more example embodiments, after the power scaling stage 508, the optical network 100 is placed in the operational state, in the field, in the deployed configuration stage 510. In the deployed configuration stage 510, the optical network 100 is configured (including the transmitters 120a-k and the optical link 102) using the downscaled transmission power values.

Specifically, at 512, the controller 110 checks whether the tilt of one or more optical amplifiers 104a-n is set to 0. For example, if the monitoring point was at the input of the first optical amplifier 104a, the controller checks if the tilt of the first optical amplifier 104a is set to 0. If yes, at 514, the tilt of the first optical amplifier 104a is returned to the baseline configuration. That is, the tilt of the first optical amplifier 104a is restored to a value indicated in the baseline configuration. On the other hand, if the controller 110 determines that the tilt is not set to 0 at 512, the controller 110 maintains the already set value for the tilt (e.g., −2), at 516.

Next, at 518, the controller 110 checks whether the optical power output by the first optical amplifier 104a (in this example) is equal to the power set in the baseline configuration. If yes, at 520, the gain for the first optical amplifier 104a is set based on a gain value in the baseline configuration and the link optimization method 500 ends at 522.

On the other hand, if no at 518, at 524, the controller 110 finds a new value for the gain of the first optical amplifier 104a. The new value for the gain provides the same value of the optical output power that was generated during the baseline configuration described in FIG. 2. For example, the new gain value may be calculated using the following equation:

New value of Gain=Amp Gain+(Baseline−Amp output power),     (4)

where amp gain is gain of the first optical amplifier 104a, baseline is a gain value in the baseline configuration, and amp output power is optical channel power value measured by the output BST monitor 112b at the output of the first optical amplifier 104a.

The equation (4) is one example to calculate the new gain value for the first optical amplifier 104a. The equation (4) is simple and effective but other techniques may be used. According to another example embodiment, a loop technique is performed to calculate the new gain value that provides the same optical output power for the first optical amplifier 104a as indicated in the baseline configuration.

Figure 5:
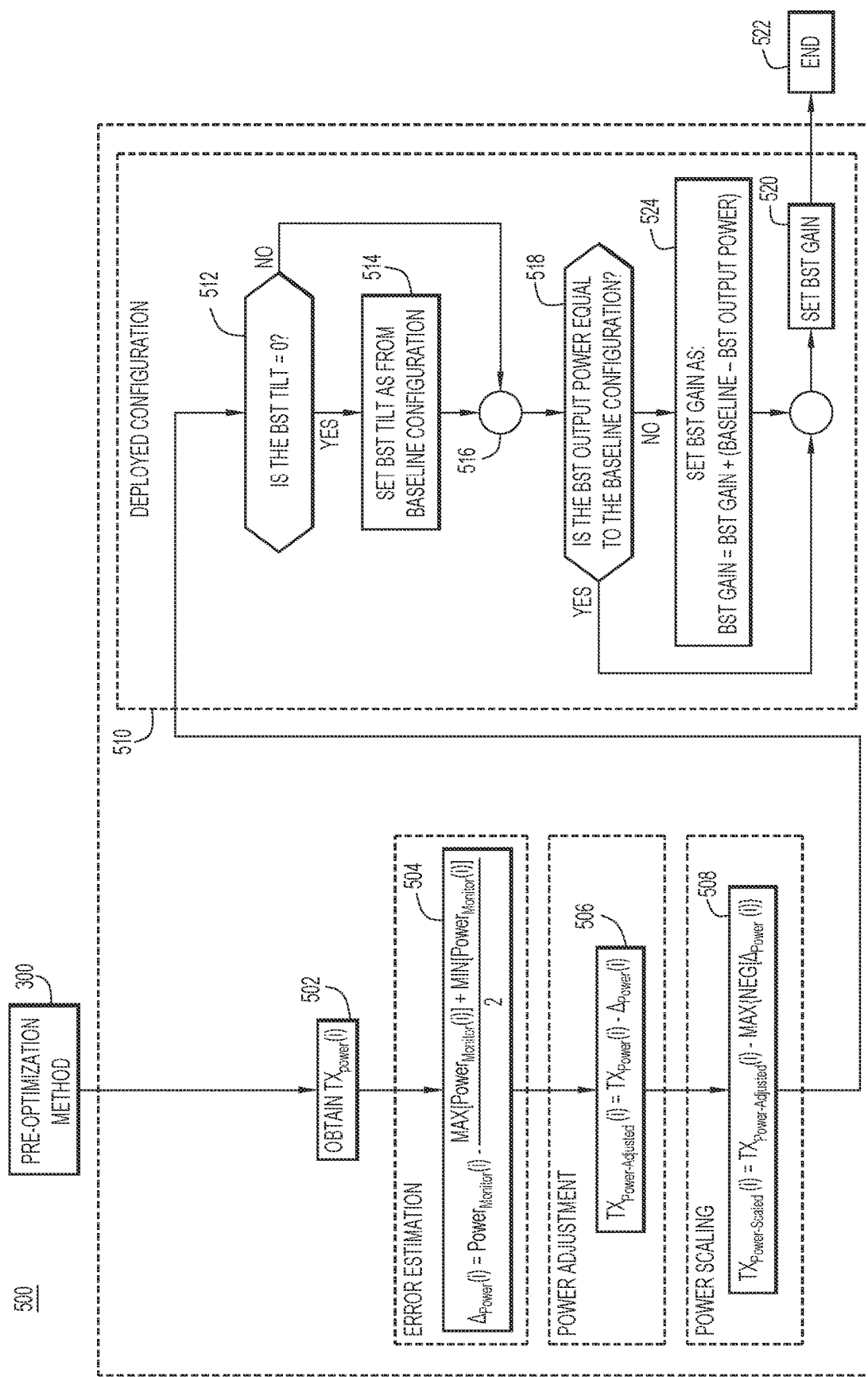
FIG. 5 is a flowchart illustrating a link power optimization method in which a plurality of optical transmitters are configured for transmitting optical signals on the optical link based on a plurality of adjusted power values, according to an example embodiment.
Figure 6:
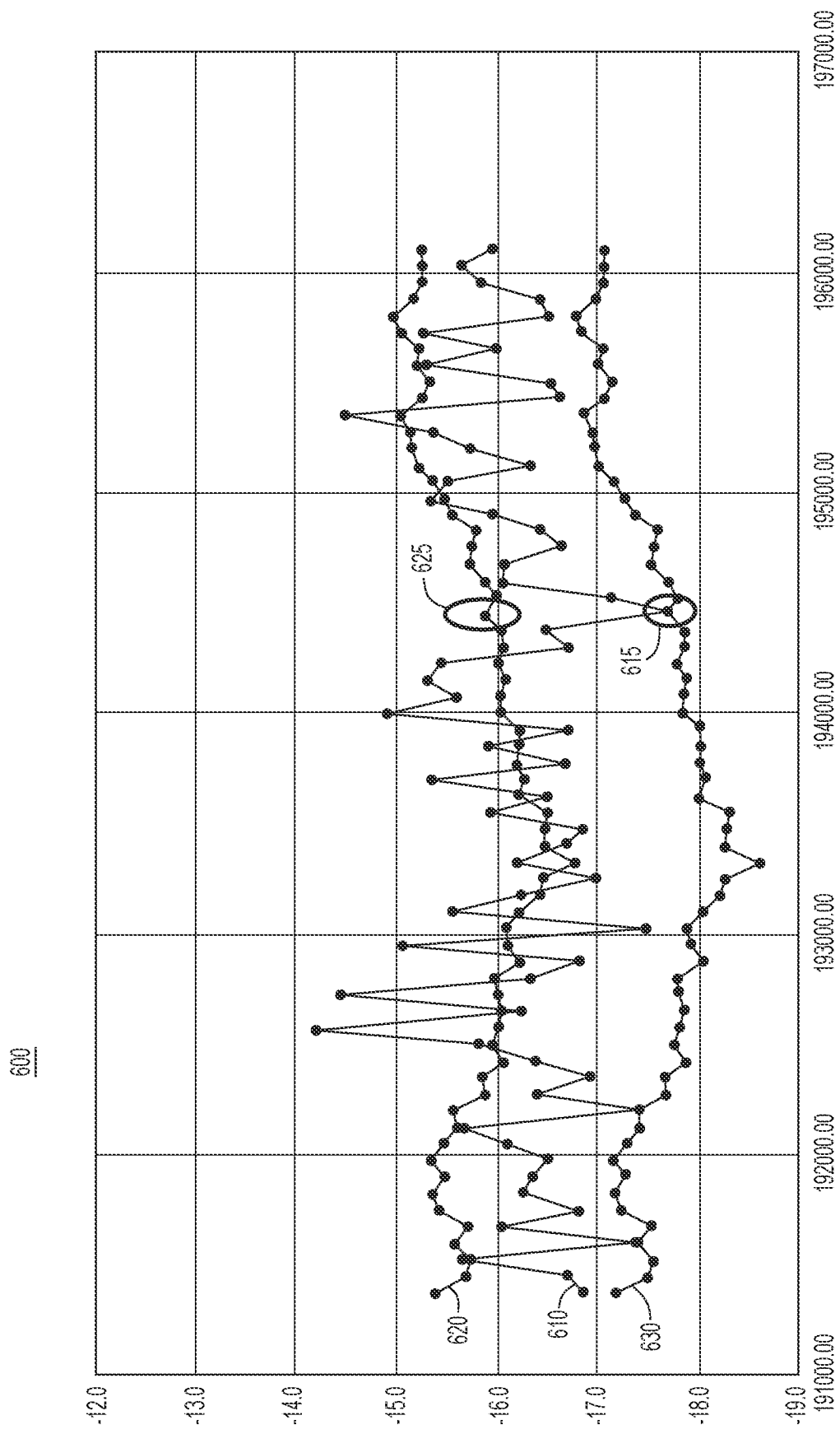
FIG. 6 is a diagram illustrating power channel distributions before, during, and after the link optimization method of FIG. 5, according to an example embodiment.

With continued reference to FIGS. 1-5, FIGS. 7A and 7B are views illustrating optical power distributions 700 and 750, respectively, of a plurality of channels of the optical link 102 detecting at different monitoring points on the optical link 102 after performing the link optimization method 500 in FIG. 5, according to example embodiments. X-axis represent the channel comb or wavelength in nanometers (nm) mapped against measured optical power values in decibel milliwatt (dBm) on the y-axis. The baseline configuration and/or set parameters for the optical network 100 are shown at a numeric reference 402.

Figure 7A:
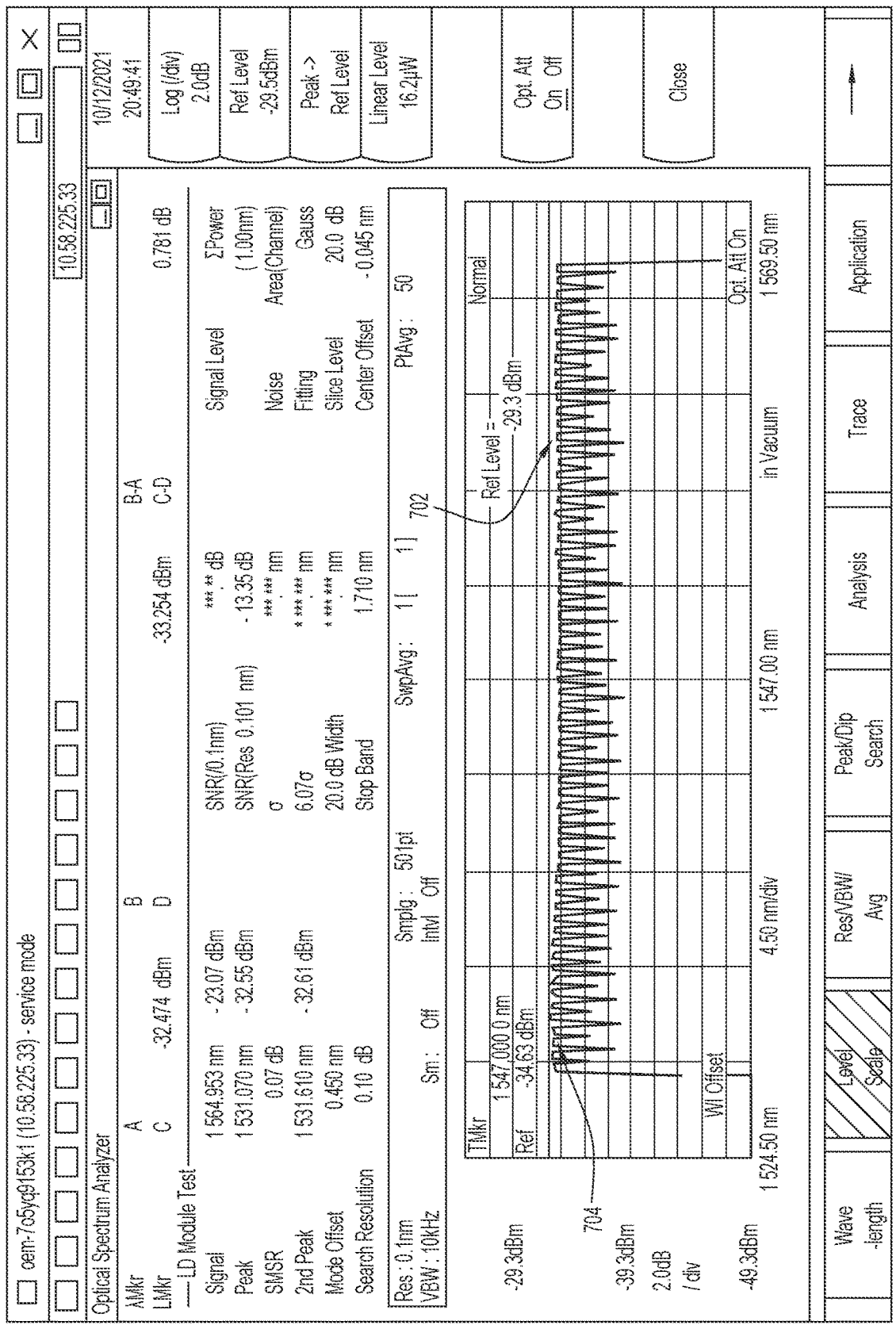
FIGS. 7A and 7B are views illustrating several optical power distributions of a plurality of channels of the optical link, after performing the link power optimization method of FIG. 5 and detected at different monitoring points on the optical link, according to example embodiments.

Specifically, FIG. 7A shows a first optical power distribution 700 measured by the input BST monitor 112a as the optical channel monitor. The first optical power distribution 700 is an example of transmission power values of the transmitters 120a-k after performing the link optimization method 500 in FIG. 5 using the output BST monitor 112b as the monitoring point (optical channel monitor) for performing the link optimization method 500. The first optical power distribution 700 has a maximum power value 702 of approximately −29 dBm and a minimum power value 704 of approximately −30 dBm. The optical transmission powers are equalized with the difference of approximately 1 dB.

Figure 7B:
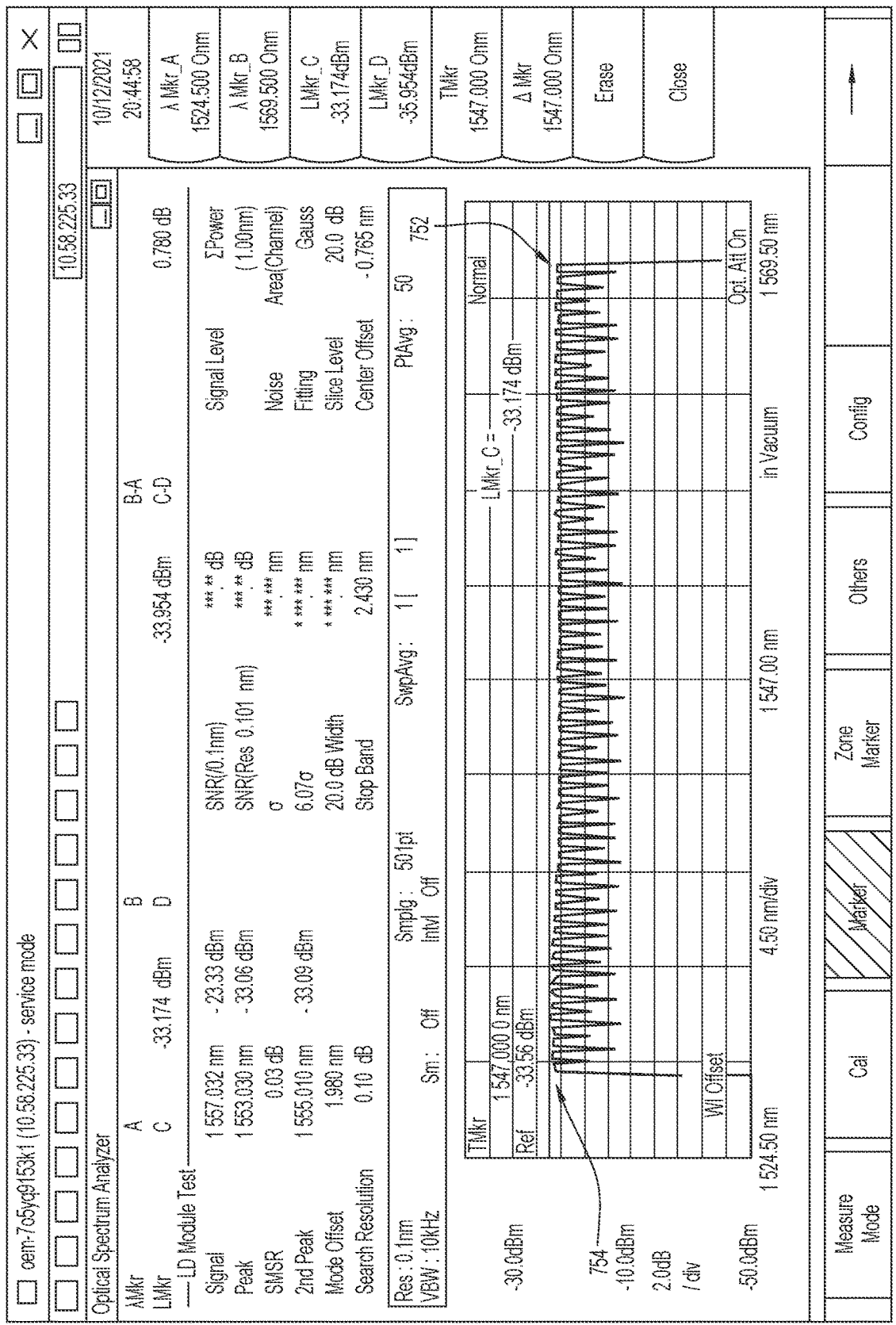

FIG. 7B shows a second optical power distribution 750 measured by the input pre monitor 112c as the optical channel monitor. The second optical power distribution 750 is an example of transmission power values of the transmitters 120a-k after performing the link optimization method 500 in FIG. 5 using the output BST monitor 112b as the monitoring point (optical channel monitor) for performing the link optimization method 500. The second optical power distribution 750 has a maximum power value 752 of approximately −33 dBm and a minimum power value 754 of approximately −32 dBm. The optical transmission powers are equalized with the difference of approximately 1 dB.

Figure 8:
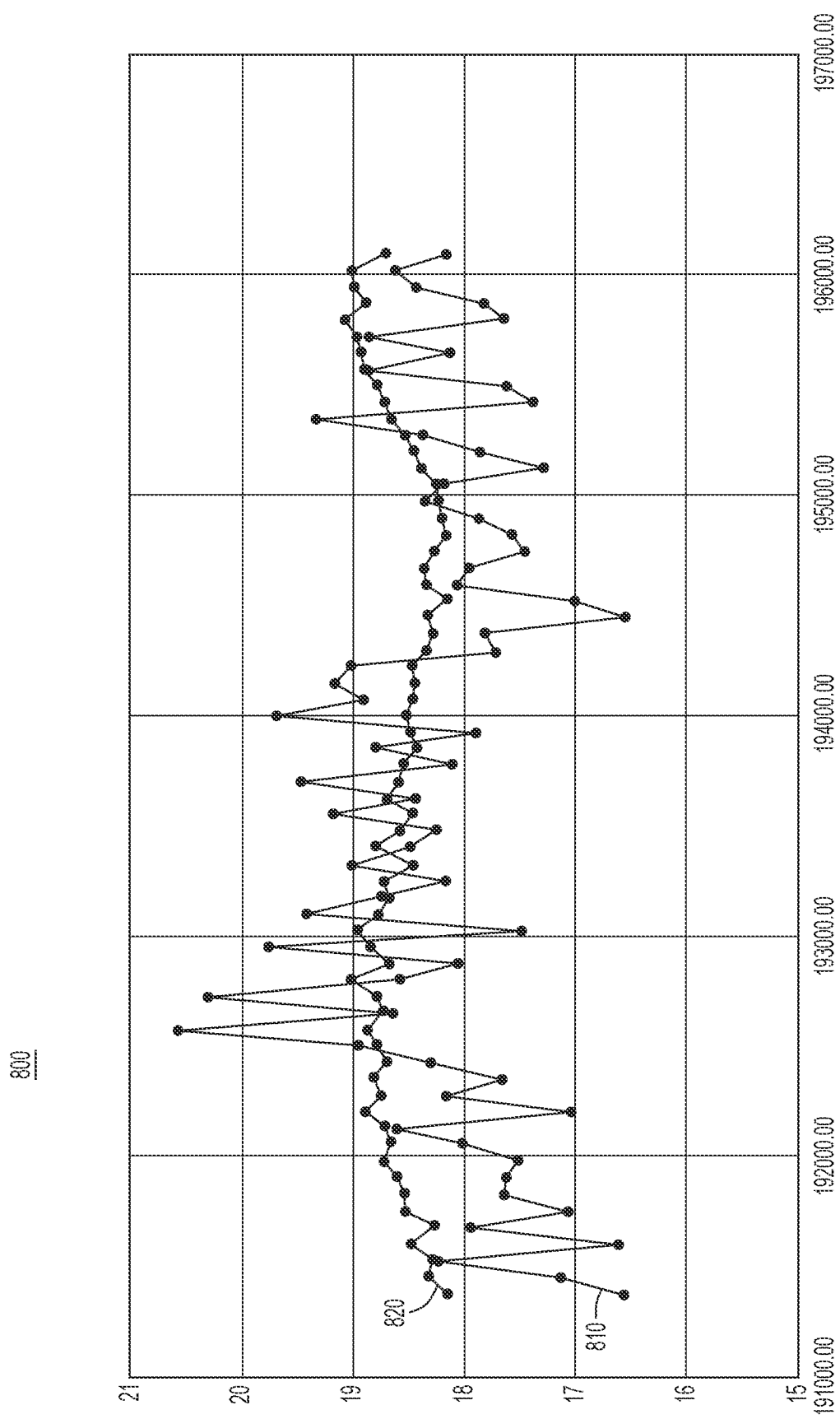
FIG. 8 is a diagram illustrating signal to noise ratio (SNR) distributions at a receiver side, before and after performing the link power optimization method of FIG. 5, according to an example embodiment.

FIG. 8 is a diagram 800 illustrating SNR distributions at a receiver side, before and after performing the link optimization method 500, according to an example embodiment. The x-axis represents the frequency spectrum in GHz of the optical channels and the y-axis represents optical channel power values in dBm. The optical channel power values are measured at the receiver side. For example, the optical channel power values are measured by the output pre monitor 112m (part of the OSA). In another example embodiment, the optical channel power values may be measured by the Rx input powers monitor 112d.

A first SNR distribution 810 includes a plurality of optical channel power values prior to performing the link optimization method 500. A second SNR distribution 820 includes a plurality of scaled channel power values i.e., the $TX_{Power-Scaled}(i)$ values obtained by the link optimization method 500. The second SNR distribution 820 has a strong decrement of the dis-equalization, with an average value of SNR significantly higher than the minimum value of SNR among the distribution.

Figure 9:
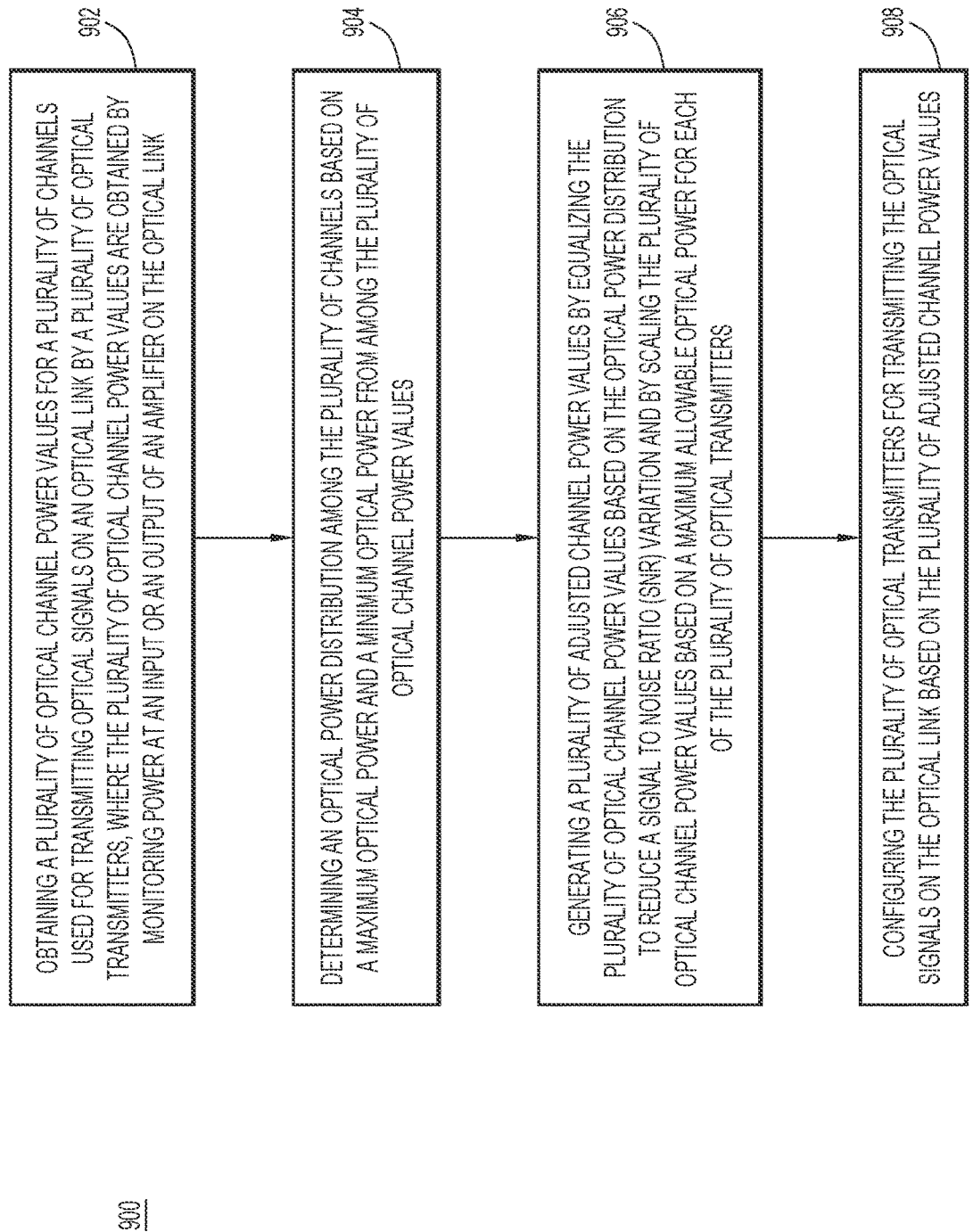
FIG. 9 is a flowchart illustrating a method of configuring an amplified optical link, according to an example embodiment.

FIG. 9 is a flowchart of a method 900 for configuring an amplified optical link, according to an example embodiment. The method 900 is performed by a controller of an optical network e.g., the controller 110 shown in FIG. 1.

At 902, the controller obtains a plurality of optical channel power values for a plurality of channels used for transmitting optical signals on an optical link by a plurality of optical transmitters. The plurality of optical channel power values are obtained by monitoring power at an input or an output of an amplifier on the optical link.

At 904, the controller determines an optical power distribution among the plurality of channels based on a maximum optical power and a minimum optical power from among the plurality of optical channel power values.

At 906, the controller generates a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters.

At 908, the controller configures the plurality of optical transmitters for transmitting the optical signals on the optical link based on the plurality of adjusted channel power values.

According to one or more example embodiments, the method 900 may further involve obtaining a baseline configuration that includes a traffic mode and a gain for the amplifier on the optical link, configuring the plurality of optical transmitters based on the baseline configuration, and setting the gain of the amplifier to a predetermined value, to produce the plurality of optical channel power values.

In at least one instance, the method 900 may further include the controller selecting the input or the output of the amplifier as a monitoring point for the plurality of optical channel power values In one form, the operation 904 of determining the optical power distribution may include obtaining an average power value based on the maximum optical power and the minimum optical power and subtracting the average power value from each of the plurality of optical channel power values to generate the optical power distribution.

According to one or more example embodiments, the optical power distribution may include a plurality of power deviation values with respect to the average power value. Additionally, equalizing the plurality of optical channel power values of operation 906 may include, for each of the plurality of optical channel power values, subtracting a corresponding power deviation value from among the plurality of power deviation values to produce an equalized power distribution for the plurality of channels.

In one instance, scaling the plurality of optical channel power values of operation 906 may involve downscaling the equalized power distribution to be equal to or below maximum allowable optical powers.

In this instance, the method 900 further involves determining the maximum allowable optical powers by obtaining a plurality of maximum allowable optical power values for the plurality of optical transmitters.

According to one or more example embodiments, the maximum allowable optical power for each channel is a preset power value that is an initial power value or a maximum allowable power value for a respective channel among the plurality of channels.

According to one or more example embodiments, the operation 908 of configuring the plurality of optical transmitters to produce the plurality of adjusted channel power values for transmitting the optical signals on the optical link may involve restoring a first value of launch power at an input of the optical link, which is set during an initial deployment of the optical link, by adjusting a second value of an optical gain of the amplifier at a transmitter side.

In one form, adjusting the second value of the optical gain of the amplifier may involve adjusting the optical gain of the amplifier based on a baseline configuration and the plurality of adjusted channel power values.

FIG. 10 is a hardware block diagram illustrating a computing device 1000 that may perform the functions of a computing or control entity referred to herein in connection with FIGS. 1-9, according to an example embodiment. The computing device 1000 performs the functions of the controller 110 of FIG. 1. The computing device 1000 may take the form of a virtual machine cluster or third-party cloud computing environment. It should be appreciated that FIG. 10 provides only an illustration of one embodiment and does not imply any limitations with regard to the environments in which different embodiments may be implemented. Many modifications to the depicted environment may be made.

As depicted, the computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, a display 1016 (optional), and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with one or more memory elements 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computing device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, the display 1016, a display screen, a computer monitor, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In still another example embodiment, an apparatus is a controller of an optical network. The apparatus includes a communication interface configured to enable network communications, a memory configured to store executable instructions, and a processor coupled to the communication interface and the memory. The processor is configured to perform operations that include obtaining a plurality of optical channel power values for a plurality of channels used for transmitting optical signals on an optical link by a plurality of optical transmitters. The plurality of optical channel power values are obtained by monitoring power at an input or an output of an amplifier on the optical link. The operations further include determining an optical power distribution among the plurality of channels based on a maximum optical power and a minimum optical power from among the plurality of optical channel power values and generating a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters. Furthermore, the operations include configuring the plurality of optical transmitters for transmitting the optical signals on the optical link based on the plurality of adjusted channel power values.

In yet another example embodiment, one or more non-transitory computer readable storage media encoded with instructions are provided. When the media is executed by the processor, the instructions cause the processor to perform operations including obtaining a plurality of optical channel power values for a plurality of channels used for transmitting optical signals on an optical link by a plurality of optical transmitters. The plurality of optical channel power values are obtained by monitoring power at an input or an output of an amplifier on the optical link. The operations further include determining an optical power distribution among the plurality of channels based on a maximum optical power and a minimum optical power from among the plurality of optical channel power values and generating a plurality of adjusted channel power values by equalizing the plurality of optical channel power values based on the optical power distribution to reduce a signal to noise ratio (SNR) variation and by scaling the plurality of optical channel power values based on a maximum allowable optical power for each of—the plurality of optical transmitters Moreover, the operations include configuring the plurality of optical transmitters for transmitting the optical signals on the optical link based on the plurality of adjusted channel power values.

In yet another example embodiment, a system is provided that includes the devices and operations explained above with reference to FIGS. 1-10.

The programs described herein (e.g., control logic 1020) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1006 and/or memory elements(s) 1004 can store data, software, code, instructions (e.g., processor instructions), logic, parameters, combinations thereof, and/or the like used for operations described herein. This includes the storage 1006 and/or memory elements(s) 1004 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

Additionally, terms such as "transmit" and "receive" are broadly used herein to refer to techniques for providing and obtaining data in network environments. For example, data may be provided and obtained through packets transmitted and received through network. Data may also be provided and obtained through data communicated via out-of-band signaling or control channels used in network environment.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, by a controller, a plurality of optical channel power values for each of a plurality of channels along a C-Band spectrum, wherein the plurality of channels are used for transmitting optical signals on an optical link by a plurality of optical transmitters and wherein the plurality of optical channel power values are obtained by monitoring power at an input or an output of an amplifier on the optical link;
determining, by the controller, an optical power distribution among the plurality of channels based on a maximum optical power and a minimum optical power from among the plurality of optical channel power values of the plurality of channels, wherein the optical power distribution includes a respective power deviation value for each of the plurality of channels along the C-Band spectrum;
generating, by the controller, a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters; and
configuring, by the controller, the plurality of optical transmitters for transmitting the optical signals, via the plurality of channels, on the optical link based on the plurality of adjusted channel power values.

2. The method of claim 1, further comprising:
obtaining a baseline configuration that includes a traffic mode and a gain for the amplifier on the optical link;
configuring the plurality of optical transmitters based on the baseline configuration; and
setting the gain of the amplifier to a predetermined value, to produce the plurality of optical channel power values.

3. The method of claim 1, further comprising:
selecting the input or the output of the amplifier as a monitoring point for the plurality of optical channel power values.

4. The method of claim 1, wherein determining the optical power distribution includes:
obtaining an average power value based on the maximum optical power and the minimum optical power; and
subtracting the average power value from each of the plurality of optical channel power values to generate the optical power distribution.

5. The method of claim 4, wherein the optical power distribution comprises a plurality of power deviation values with respect to the average power value, and
wherein equalizing the plurality of optical channel power values includes for each of the plurality of optical channel power values subtracting a corresponding power deviation value from among the plurality of power deviation values to produce an equalized power distribution for the plurality of channels.

6. The method of claim 5, wherein scaling the plurality of optical channel power values includes downscaling the equalized power distribution to be equal to or below maximum allowable optical powers.

7. The method of claim 6, further comprising:
determining the maximum allowable optical powers by obtaining a plurality of maximum allowable optical power values for the plurality of optical transmitters.

8. The method of claim 1, wherein the maximum allowable optical power for each channel is a preset power value that is an initial power value or a maximum allowable power value for a respective channel among the plurality of channels.

9. The method of claim 1, wherein configuring the plurality of optical transmitters to produce the plurality of adjusted channel power values for transmitting the optical signals on the optical link includes:
restoring a first value of launch power at an input of the optical link, which is set during an initial deployment of the optical link, by adjusting a second value of an optical gain of the amplifier at a transmitter side.

10. The method of claim 9, wherein adjusting the second value of the optical gain of the amplifier includes:
adjusting the optical gain of the amplifier based on a baseline configuration and the plurality of adjusted channel power values.

11. The method of claim 1, wherein equalizing the plurality of optical channel power values includes:
determining a plurality of power deviation values based on the maximum optical power and the minimum optical power; and
for each of the plurality of optical channel power values using a corresponding power deviation value from among the plurality of power deviation values to generate an equalized power distribution for the plurality of channels.

12. An apparatus comprising:
a communication interface configured to enable network communications;
a memory configured to store executable instructions; and
a processor coupled to the communication interface and the memory and configured to perform operations including:
obtaining a plurality of optical channel power values for a plurality of channels used for transmitting optical signals on an optical link by a plurality of optical transmitters, wherein the plurality of optical channel power values are obtained by monitoring power at an input or an output of an amplifier on the optical link;
determining an optical power distribution among the plurality of channels by obtaining an average power value based on a maximum optical power and a minimum optical power and subtracting the average power value from each of the plurality of optical channel power values to generate the optical power distribution;
generating a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters; and
configuring the plurality of optical transmitters for transmitting the optical signals on the optical link based on the plurality of adjusted channel power values.

13. The apparatus of claim 12, wherein the processor is further configured to:
obtain a baseline configuration that includes a traffic mode and a gain for the amplifier on the optical link;
configure the plurality of optical transmitters based on the baseline configuration; and
set the gain of the amplifier to a predetermined value, to produce the plurality of optical channel power values.

14. The apparatus of claim 12, wherein the processor is further configured to:
select the input or the output of the amplifier as a monitoring point for the plurality of optical channel power values.

15. The apparatus of claim 12, wherein the optical power distribution comprises a plurality of power deviation values with respect to the average power value, and
wherein equalizing the plurality of optical channel power values includes for each of the plurality of optical channel power values subtracting a corresponding power deviation value from among the plurality of power deviation values to produce an equalized power distribution for the plurality of channels.

16. The apparatus of claim 15, wherein the processor is configured to scale the plurality of optical channel power values by:
downscaling the equalized power distribution to be equal to or below maximum allowable optical powers.

17. One or more non-transitory computer readable storage media encoded with instructions that, when executed by a processor, cause the processor to perform operations including:
obtaining a baseline configuration that includes a traffic mode and a gain for an amplifier on an optical link;
configuring a plurality of optical transmitters based on the baseline configuration;
setting a gain of the amplifier to a predetermined value, to produce a plurality of optical channel power values;
obtaining the plurality of optical channel power values for a plurality of channels used for transmitting optical signals on the optical link by the plurality of optical transmitters, wherein the plurality of optical channel power values are obtained by monitoring power at an input or an output of the amplifier on the optical link;
determining an optical power distribution among the plurality of channels based on a maximum optical power and a minimum optical power from among the plurality of optical channel power values;
generating a plurality of adjusted channel power values by equalizing the plurality of optical channel power values based on the optical power distribution to reduce a signal to noise ratio (SNR) variation and by scaling the plurality of optical channel power values based on a maximum allowable optical power for each of the plurality of optical transmitters; and
configuring the plurality of optical transmitters for transmitting the optical signals on the optical link based on the plurality of adjusted channel power values.

18. The one or more non-transitory computer readable storage media according to claim 17, wherein the instructions further cause the processor to perform:
selecting the input or the output of the amplifier as a monitoring point for the plurality of optical channel power values.

19. The one or more non-transitory computer readable storage media according to claim 17, wherein the instructions cause the processor to determine the optical power distribution by:
obtaining an average power value based on the maximum optical power and the minimum optical power; and
subtracting the average power value from each of the plurality of optical channel power values to generate the optical power distribution.

20. The one or more non-transitory computer readable storage media according to claim 17, wherein the instructions cause the processor to configure the plurality of optical transmitters to produce the plurality of adjusted channel power values for transmitting the optical signals on the optical link by:
restoring a first value of launch power at an input of the optical link, which is set during an initial deployment of the optical link, by adjusting a second value of an optical gain of the amplifier at a transmitter side.

* * * * *